US007542170B2

(12) United States Patent
Chen et al.

(10) Patent No.: US 7,542,170 B2
(45) Date of Patent: Jun. 2, 2009

(54) METHOD FOR ENHANCING PRINT QUALITY OF HALFTONE IMAGES

(76) Inventors: Chen-Chung Chen, No. 62, Lane 125, Hsin Hsing St., Lin 10, Kuang Hua Li, Yang Mei Jen, Tao Yuan Hsien (TW); Cheng-Huei Chiang, No. 686, Sec. 4, Sha Tien Rd., Lung Ching Hsiang, Tai Chung Hsien (TW)

( * ) Notice: Subject to any disclaimer, the term of this patent is extended or adjusted under 35 U.S.C. 154(b) by 810 days.

(21) Appl. No.: 11/032,049

(22) Filed: Jan. 11, 2005

(65) Prior Publication Data

US 2006/0152763 A1 Jul. 13, 2006

(51) Int. Cl.
*H04N 1/40* (2006.01)

(52) U.S. Cl. ...................... 358/3.03; 358/1.9; 358/3.27; 382/252; 382/266

(58) Field of Classification Search ................ 358/3.03, 358/3.04, 3.05, 3.27, 1.9; 382/252, 263, 382/266
See application file for complete search history.

(56) References Cited

U.S. PATENT DOCUMENTS

| | | | | |
|---|---|---|---|---|
| 5,068,746 | A * | 11/1991 | Ohsawa et al. | 358/443 |
| 6,026,199 | A * | 2/2000 | Sommer | 382/252 |
| 6,041,139 | A * | 3/2000 | Okubo et al. | 382/199 |
| 6,977,757 | B1 * | 12/2005 | Takahashi et al. | 358/3.05 |
| 2004/0190071 | A1 * | 9/2004 | Thakur | 358/3.04 |

* cited by examiner

*Primary Examiner*—Thomas D Lee
(74) *Attorney, Agent, or Firm*—Perkins Coie LLP

(57) ABSTRACT

A method for enhancing the print quality of halftone images makes use of error diffusion to perform halftone image processing to a document. After an RGB image is obtained by scanning the document, a high-pass filter is used to detect the edge characteristics and edge directions of the RGB image. Next, during the error diffusion process, a condition quantizer is used to separately process pixels both with and without edge characteristics based on the edge characteristics, gray scale values, and accumulated errors of input pixels. Pixels without edge characteristics can thus have a smoother distribution by means of error diffusion, and the pixels with edge characteristics can have a concentrated distribution, thereby the edge of the text in the document can be sharpened.

21 Claims, 5 Drawing Sheets

| | | |
|---|---|---|
| −1 | −2 | −1 |
| 0 | 0 | 0 |
| 1 | 2 | 1 |

FIG. 3A

| | | |
|---|---|---|
| −1 | 0 | 1 |
| −2 | 0 | 2 |
| −1 | 0 | 1 |

FIG. 3B

| | | |
|---|---|---|
| −2 | −1 | 0 |
| −1 | 0 | 1 |
| 0 | 1 | 2 |

FIG. 3C

| | | |
|---|---|---|
| 0 | 1 | 2 |
| −1 | 0 | 1 |
| −2 | −1 | 0 |

FIG. 3D

|  | $e_{ij}$ | 0 |
|---|---|---|
| 5 | 6 | 5 |

FIG. 6A

|  | $e_{ij}$ | 8 |
|---|---|---|
| 2 | 0 | 6 |

FIG. 6B

|  | $e_{ij}$ | 6 |
|---|---|---|
| 0 | 2 | 8 |

FIG. 6C

|  | $e_{ij}$ | 0 |
|---|---|---|
| 8 | 5 | 3 |

FIG. 6D

FIG. 7C
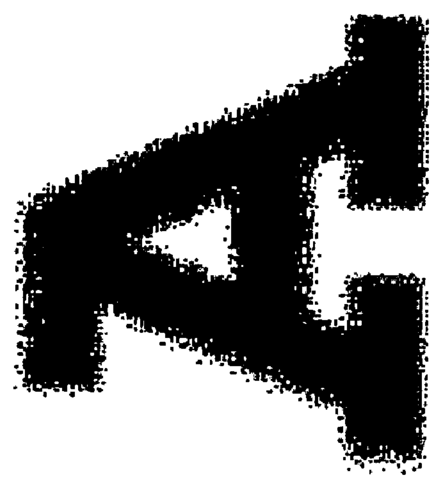
FIG. 7B
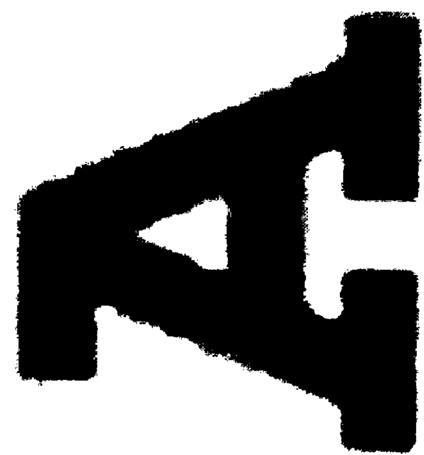
FIG. 7A

METHOD FOR ENHANCING PRINT QUALITY OF HALFTONE IMAGES

BACKGROUND OF THE INVENTION

1. Field of Invention

The present invention relates generally to a method for enhancing print quality of halftone images. More particularly, the method is applicable to the halftone print mode of a multi-function printer, or a regular printer, in which, the edge characteristic parameter is analyzed and fed back to the print process of an error diffusion method.

2. Description of Related Art

Because multi-function printers and scanners are being used in daily life more and more frequently, the quality and performance of image printing is getting important. The ultimate goal is to make the output image data equal to the original image data as possible. Some algorithms are used to modify the process to make the colors of the output image more smoother, and get better reproduction of the image.

In an ordinary image processing flow, a document manuscript is first scanned and sampled by a scanning module to form a digitized RGB data for input. The data goes through the CMYK conversion, halftone processing and picture/text enhanced processing, a CMYK halftone image is produced and finally printed by a printer module. From scanning/sampling to printing, the CMYK conversion and halftone processing are required, by proper arrangement of printed positions of various colors so that human eyes can perceive a variation of colors and color levels.

With halftone processing, order dithering and error diffusion are the two main methods currently employed. In the order dithering method, the resolution is reduced to increase the gray scale levels, i.e., an image region is encoded in the point mode to simulate the gray scale effect seen by the human eye. In other words, if there are many points of a color in a region encoded in the point mode, the gray scale level of this color is higher.

Visually, a better smooth effect can be obtained through the error diffusion method. The error diffusion method is based on the principle that the generated gray scale error is distributed to adjacent pixels proportionally when a continuous gray scale image is digitized in binary. That is, the gray scale error in a specific direction is used to determine whether the next pixel is black or white after being accumulated in a specific ratio. As shown in FIG. 1, an error diffusion circuit mainly comprises a first adder 11, a quantizer 12, a second adder 13 and an error filter 14, where Xij is an input image pixel, Uij is an error diffusion pixel, X'ij is an output image pixel, and eij is an error to be distributed to adjacent pixels.

The error eij of adjacent pixels is obtained from the pixel X'ij of the output image subtracts the pixel Uij of the error diffusion using the second adder 13. The error eij of adjacent pixels is processed by the error filter H(z) 14 to get a corrected pixel error H(e(i,j)). The first adder 11 adds the input image pixel Xij by the pixel error H(e(i,j)) to obtain a corrected error diffusion pixel Uij. The error diffusion pixel Uij is then compared with a threshold T of the quantizer 12 to get two extreme values (0 or 1) for output. That is, if the error diffusion pixel Uij is larger than the threshold T, the output binary digit is 1; if the error diffusion pixel Uij is smaller than the threshold T, the output binary digit is 0. Therefore, in the error diffusion method, a known pixel is considered. The pixel has a certain error with the final result. If this error is distributed to surrounding pixels, the error of a single pixel will have little influence to the final output picture.

Although the halftone processing way by means of error diffusion has a smoother effect visually on image processing, but causes other problems making the edges of regions with large difference in gray scale values soft and dispersive. For instance, blurs will be easily generated at text edges on an image.

SUMMARY OF THE INVENTION

A method for enhancing the print quality of halftone images is introduced to carry out real-time edge enhancement on halftone processing by means of error diffusion, thereby the picture and text edges can be sharpened.

The preferred embodiment of the method for enhancing the print quality of halftone images includes the following steps of detecting the edge characteristics and edge directions of the document to be printed, performing halftone processing to the document by means of error diffusion, and separately processing input image pixels both with as well as without edge characteristics in the document based on the detected edge characteristics and edge directions during the process of error diffusion. Thereby, pixels with edge characteristics can have a concentrated distribution, while pixels without edge characteristics can have a divergent distribution.

The various objects and advantages of the preferred embodiment will be more readily understood from the following detailed description when read in conjunction with the appended drawing, in which:

BRIEF DESCRIPTION OF THE DRAWINGS

FIG. 3A is a diagram of a horizontal filter used in the present invention;

FIG. 3B is a diagram of a vertical filter used in the present invention;

FIG. 3C is a diagram of a right diagonal ("/") filter used in the present invention;

FIG. 3D is a diagram of a left diagonal ("\") filter used in the present invention;

FIG. 6A is a diagram of a horizontal error filter used in the present invention;

FIG. 6B is a diagram of a vertical error filter used in the present invention;

FIG. 6C is a diagram of a right diagonal ("/") error filter used in the present invention;

FIG. 6D is a diagram of a left diagonal ("\") error filter used in the present invention;

FIG. 7A shows an original image of a document to be printed;

FIG. 7B is an output image of FIG. 7A printed by using the conventional error diffusion method; and FIG. 7C is an output image of FIG. 7A printed by using the present invention method.

DETAILED DESCRIPTION OF THE PREFERRED EMBODIMENTS

There is often a deckle-edged phenomenon at the edge of text on an image which includes text that has undergone halftone processing using the conventional error diffusion method. The present invention aims to propose a modified error diffusion method to solve this problem.

When enhancing pictures and text, it is necessary to analyze the characteristics of the document to be printed first. An ordinary document generally includes two main parts.

The first main part has apparent edges with background, such as text, lines, special symbols and so on. Their colors and gray scale values are very simple.

The second main part has no apparent edges with the background. Their colors and gray scale values vary greatly.

According to the previous description of analysis, the key is to determine whether there exists a boundary, and further separately processing the text and image.

Figure 2:
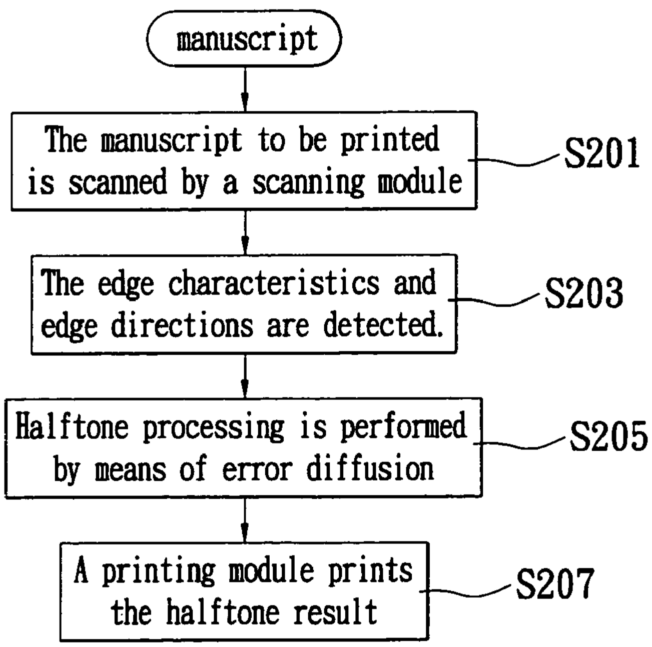
FIG. 2 is a flowchart of a method for enhancing the print quality of halftone images of the present invention.

As shown in FIG. 2, a manuscript to be printed is inputted in an ordinary picture file format or scanned by a scanning module to get an RGB or CMYK color spatial image having brightness information (Step S201). Next, the edge characteristics and edge directions of the image are detected using a high-pass filter (e.g., a Sobel operator) (Step S203). Halftone processing is then performed by means of error diffusion based on the edge characteristic parameters obtained (Step S205). Finally, a printing module prints the halftone result (Step S207). The error diffusion method of the embodiment of the present invention will provide the edge characteristic parameters for a quantizer to determine where to print and the direction distribution of error diffusion, which will be illustrated in more detail below.

The method for enhancing the print quality of halftone images of the present invention is disclosed, the edge characteristics of an image are first captured to discriminate text or picture regions in the document before proceeding on to the error diffusion method. As shown in FIGS. 3A to 3D, the high-pass filter used in the present invention can be a horizontal filter, a vertical filter, a right diagonal ("/") filter, or a left diagonal ("\") filter. The edge characteristics and edge directions of the image can be detected by using the high-pass filter shown in FIGS. 3A to 3D.

Figure 4:
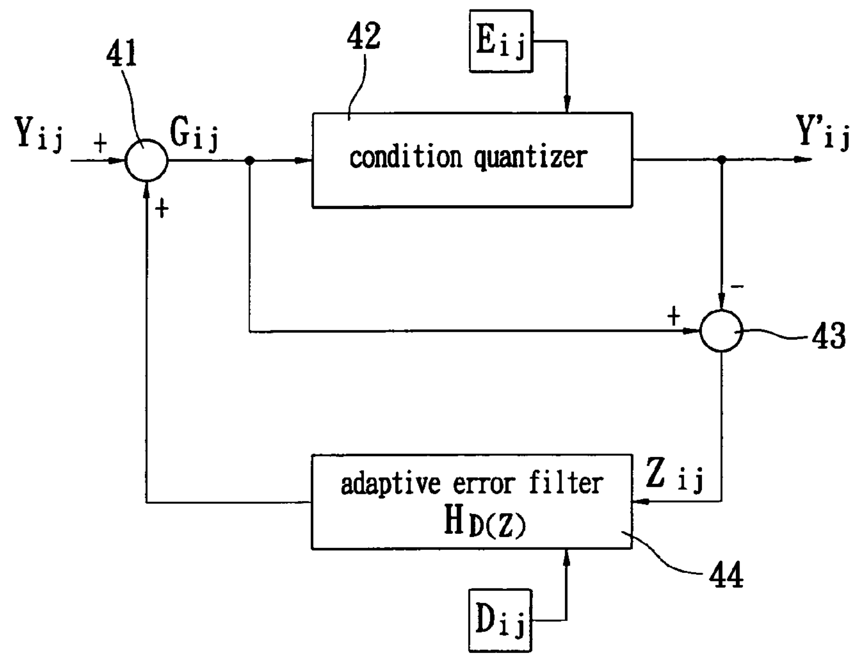
FIG. 4 is a system architecture diagram of an error diffusion method of the present invention.

As shown in FIG. 4, the system of the error diffusion method of the present invention comprises a first adder 41, a condition quantizer 42, a second adder 43, and an adaptive error filter 44, where Yij is an input image pixel, Gij is an error diffusion pixel, Y'ij is an output image pixel, Zij is an error of nearby pixels, Eij is an edge characteristic value of the input image pixel, and Dij is an edge direction response value of the input image pixel. Eij and Dij are obtained during detection of the edge characteristics and edge directions of the image.

Figure 1:
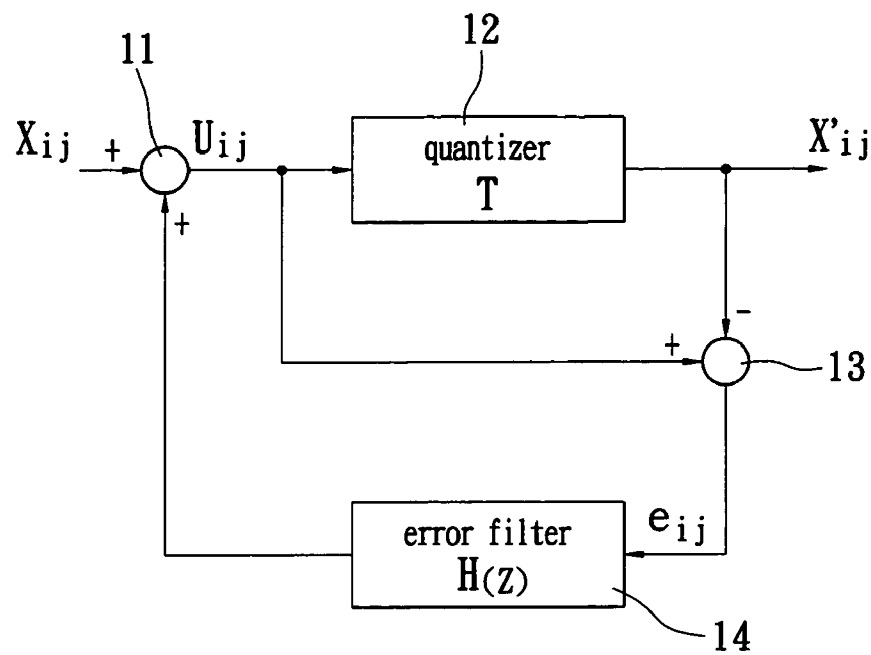
FIG. 1 is a system architecture diagram of a conventional error diffusion method.

One difference between the system of the error diffusion method of the present invention and that shown in FIG. 1 is that the conventional quantizer is replaced with the condition quantizer 42, and the conventional error filter is replaced with the adaptive error filter 44. The condition quantizer 42 will separately process input image pixels both with as well as without edge characteristics based on the detected edge characteristics and edge directions during the process of error diffusion so that pixels with edge characteristics can have a concentrated distribution while pixels without edge characteristics can have a divergent distribution. The adaptive error filter 44 is used to get a reasonable distribution of errors through different filter types corresponding to different directional edge characteristics.

Figure 5:
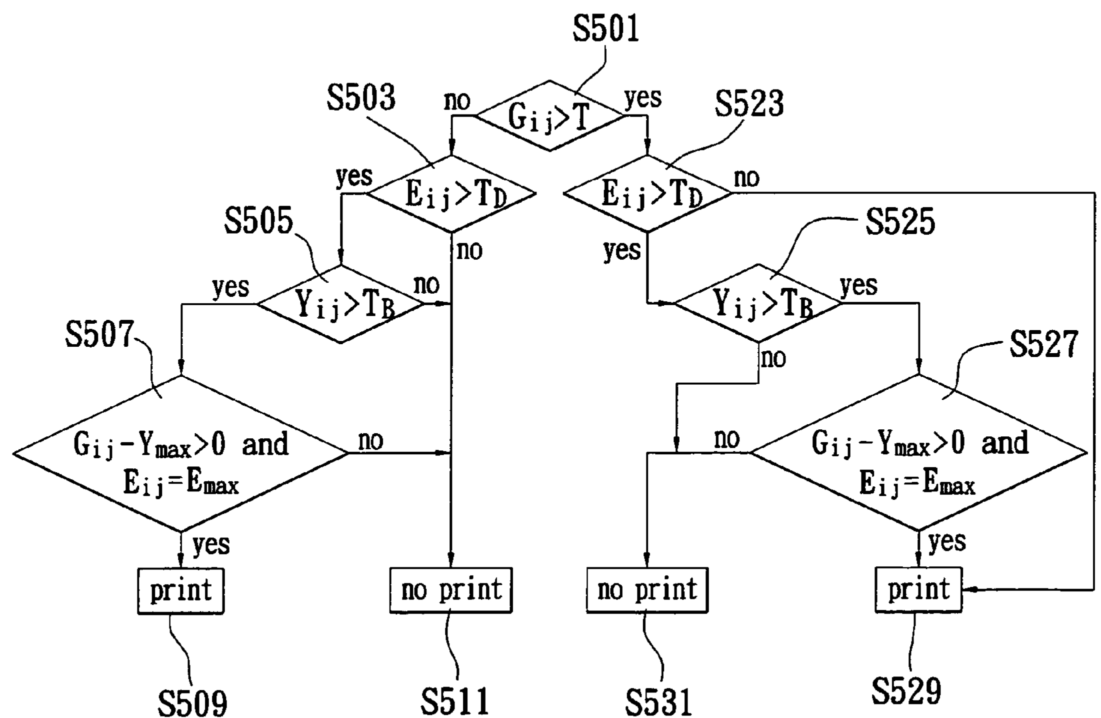
FIG. 5 is a flowchart of a condition quantizer of the present invention.

In FIG. 5, T represents a threshold of the condition quantizer 42 for verifying the quantity accumulation of the error diffusion pixel. $T_D$ is a preset edge characteristic verifying threshold of the input image pixel. $T_B$ is a preset gray-scale-verifying threshold of the input image pixel. Ymax is a maximum gray scale value of the input image pixel (e.g., Ymax=255 for an 8-bit gray scale image). Emax is a maximum edge characteristic value in adjacent pixels of the input image pixel. The condition quantizer comprises the flowing steps.

First, the condition quantizer 42 compares Gij with T (Step S501). If the gray scale value of Gij is smaller than T, whether Eij is larger than $T_D$ is determined (Step S503). If Eij is larger than $T_D$, whether Yij is larger than $T_B$ is determined (Step S505). If Yij is larger than $T_B$, whether Gij minus Ymax is larger than 0 is determined and whether Eij is equal to Emax is determined (Step S507). If all the answers are "yes", the output of the condition quantizer 42 is the binary digit 1, representing print (Step S509). If one of the answers of Steps S503, S505, and S507 is "no", the output of the condition quantizer 42 is the binary digit 0, representing no print (Step S511).

If the gray scale value of Gij is larger than T, whether Eij is larger than $T_D$ is determined (Step S523). If Eij is larger than $T_D$, whether Yij is larger than $T_B$ is determined (Step S525). If Yij is larger than $T_B$, whether Gij minus Ymax is larger than 0 is determined and whether Eij is equal to Emax is determined (Step S527). If all the answers are "yes", the output of the condition quantizer 42 is the binary digit 1, representing print (Step S529). If one of the answers of Steps S525 and S527 is "no", the output of the condition quantizer 42 is the binary digit 0, representing no print (Step S531). If the answer of Step 523 is "no", the output of the condition quantizer 42 is the binary digit 1, representing print (Step S529).

The condition quantizer 42 disclosed in the embodiment of the present invention follows the flowchart of FIG. 5. When Eij is smaller than $T_D$ (i.e., the answers of Steps S503 and S523 are "no"), namely the input image pixel has no edge characteristics, whether to print or not is determined by the conventional error diffusion method to get a smooth effect for the output image. However, when Eij is larger than $T_D$, whether the input image pixel has edge characteristics is further determined by Steps S505 and S507 or S525 and S527. If all the answers are "yes", the input image pixel will be printed so that the output image has a concentrated effect on the text edges. The text edges can thus be sharpened.

As shown in FIGS. 6A to 6D, the adaptive error filter 44 used in the preferred embodiment of the present invention can be a horizontal error filter, a vertical error filter, a right diagonal ("/") error filter, or a left diagonal ("\") error filter. The adaptive error filter 44 can make use of error filters corresponding to each different directions based on the edge direction of the input image pixel so that the part with edge characteristics has a concentrated distribution, while the part without edge characteristics has a divergent distribution Please refer to FIGS. 7A to 7C. FIG. 7A shows an original image. If a conventional error diffusion method is used, the result shown in FIG. 7B will be obtained. There is an apparent deckle-edged phenomenon at text edges in FIG. 7B. If the modified error diffusion method of the present invention is used, the result shown in FIG. 7C will be obtained. As can be seen clearly, the text edges have been sharpened.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are embraced within the scope of the invention as defined in the claims.

We claim:

1. A method for enhancing the print quality of halftone images, the method comprising:

detecting an edge characteristic and an edge direction of a document to be printed;

performing halftone processing to the document by means of error diffusion; and separately processing input image pixels both with and without an edge characteristic in the document based at least in part upon the detected edge characteristic and the edge direction, wherein processing causes the pixels with an edge characteristic to have a concentrated distribution and the pixels without an edge characteristic to have a divergent distribution, wherein a conditioning quantizer determines whether the input image pixels are to be printed based at least in part upon whether an input image pixel is larger than a present gray scale verifying threshold and whether a second pixel is larger than a second threshold, and wherein the condition quantizer determines whether the input image pixels are to be printed based on whether an edge characteristic value of the input image pixels is larger than a preset edge characteristic threshold.

2. The method of claim 1 wherein a color spatial image having brightness information is obtained after the document is scanned or inputted as an ordinary picture format.

3. The method of claim 2 wherein the color spatial image having brightness information is an RGB image or a CMYK image.

4. The method of claim 1 wherein detection of the edge characteristics and the edge direction is accomplished by means of a high-pass filter.

5. The method of claim 4 wherein the high-pass filter is a horizontal filter.

6. The method of claim 4 wherein the high-pass filter is a vertical filter.

7. The method of claim 4 wherein the high-pass filter is a diagonal filter.

8. The method of claim 1 wherein the first pixel is an input image pixel and the first threshold is a preset gray scale verifying threshold.

9. The method of claim 1 wherein the condition quantizer determines whether the input image pixels are to be printed based at least in part on whether a gray scale value of the input image pixels is larger than a preset quantization threshold.

10. The method of claim 1 wherein an adaptive error filter is used in the error diffusion method so that pixels with an edge characteristic have a concentrated distribution, and pixels without an edge characteristic have a divergent distribution.

11. The method of claim 10 wherein the adaptive error filter is a horizontal error filter.

12. The method of claim 10 wherein the adaptive error filter is a vertical error filter.

13. The method of claim 10 wherein the adaptive error filter is a diagonal error filter.

14. A method for enhancing the print quality of halftone images, the method comprising:

detecting an edge characteristic and an edge direction of a document to be printed;

performing halftone processing to the document by means of error diffusion; and separately processing input image pixels both with and without an edge characteristic in the document based at least in part upon the detected edge characteristic and the edge direction, wherein processing causes the pixels with an edge characteristic to have a concentrated distribution and the pixels without an edge characteristic to have a divergent distribution, and wherein a conditioning quantizer determines whether the input image pixels are to be printed based at least in part upon whether an input image pixel is larger than a present gray scale verifying threshold and whether a second pixel is larger than a second threshold; and wherein the condition quantizer determines whether the input image pixels are to be printed based at least in part on whether the gray scale value obtained from an error diffusion pixel minus the maximum gray scale value of the input image pixel is larger than zero and whether the edge characteristic value of the input image pixel is equal to the maximum edge characteristic value of adjacent pixels.

15. The method of claim 14 wherein detecting an edge characteristics and an edge directions in the document is accomplished by means of a high-pass filter.

16. The method of claim 15 wherein the high-pass filter is one of a horizontal filter, a vertical filter, and a diagonal filter.

17. The method of claim 14 wherein the second threshold includes at least one of a gray scale verifying threshold, an edge characteristic threshold, and a quantization threshold.

18. The method of claim 14 wherein the means of error diffusion comprises an adaptive error filter so that pixels with an edge characteristic have a concentrated distribution, and pixels without an edge characteristic have a divergent distribution.

19. A system, comprising:

means for detecting an edge characteristic and an edge direction of a document to be printed;

means for performing halftone processing to the document by error diffusion;

means for separately processing input image pixels both with and without an edge characteristic in the document based at least in part upon the detected edge characteristic and the edge direction, wherein processing causes the pixels with an edge characteristic to have a concentrated distribution and the pixels without an edge characteristic to have a divergent distribution;

means for determining whether the input image pixels are to be printed based at least in part upon whether an input image pixel is larger than a present gray scale verifying threshold and whether a second pixel is larger than a second threshold; and means for determining whether the input image pixels are to be printed based on whether an edge characteristic value of the input image pixels is larger than a preset edge characteristic threshold.

20. The system of claim 19, further comprising:

means for obtaining brightness information after the document is scanned or inputted as an ordinary picture format.

21. The system of claim 19 wherein the means for determining whether the input image pixels are to be printed determines whether to print the input image pixels based at least in part on whether a gray scale value of the input image pixels is larger than a preset quantization threshold.

* * * * *